(12) United States Patent
Ueki

(10) Patent No.: US 7,233,400 B2
(45) Date of Patent: Jun. 19, 2007

(54) INTERFEROMETER FOR MEASURING VIRTUAL CONTACT SURFACES

(75) Inventor: Nobuaki Ueki, Saitama (JP)

(73) Assignee: Fujinon Corporation, Saitama (JP)

( * ) Notice: Subject to any disclaimer, the term of this patent is extended or adjusted under 35 U.S.C. 154(b) by 143 days.

(21) Appl. No.: 11/204,177

(22) Filed: Aug. 16, 2005

(65) Prior Publication Data

US 2006/0044567 A1    Mar. 2, 2006

(30) Foreign Application Priority Data

Aug. 30, 2004  (JP)  ............................. 2004-250877

(51) Int. Cl.
*G01B 11/02*    (2006.01)

(52) U.S. Cl. ...................................... 356/497; 356/511

(58) Field of Classification Search ................ 356/492, 356/493, 496, 497, 511, 512
See application file for complete search history.

(56) References Cited

U.S. PATENT DOCUMENTS

| | | | |
|---|---|---|---|
| 6,822,745 B2 * | 11/2004 | De Groot et al. | 356/496 |
| 6,906,805 B1 * | 6/2005 | Ina et al. | 356/497 |
| 6,985,232 B2 * | 1/2006 | Sezginer | 356/451 |
| 7,019,841 B2 * | 3/2006 | Mathur | 356/497 |

FOREIGN PATENT DOCUMENTS

| | | |
|---|---|---|
| JP | 5-121403 | 5/1993 |
| JP | 8-240413 | 9/1996 |
| JP | 2001-298036 | 10/2001 |
| JP | 2002-48519 | 2/2002 |

\* cited by examiner

*Primary Examiner*—Gregory J. Toatley, Jr.
*Assistant Examiner*—Michael A. Lyons
(74) *Attorney, Agent, or Firm*—Snider & Associates; Ronald R. Snider

(57) ABSTRACT

The light source is a low-coherence light source, and the optical path is regulated so that the reflected light from the upper surface of each metal wire and that from the reference surface interfere with each other during the first measuring operation, and so that the reflected light from the small regional surface of the conductive layer and that from the reference surface interfere with each other during the second measuring operation. The light detecting surface is divided into a plurality of detecting unit regions, and obtains interference fringe information corresponding to the upper surfaces of the metal wires or the general shape of the first or second virtual contact surface engaged with the small regional surfaces of the conductive layer on the basis of the light intensity averaged and detected with respect to the detecting unit regions.

5 Claims, 2 Drawing Sheets

INTERFEROMETER FOR MEASURING VIRTUAL CONTACT SURFACES

RELATED APPLICATIONS

This application claims the priority of Japanese Patent Application No. 2004-250877 filed on Aug. 30, 2004, which is incorporated here by reference.

BACKGROUND OF THE INVENTION

1. Field of the Invention

The present invention relates to an interferometer for measuring shapes, and more particularly to an interferometer capable of being utilized to measure the coplanarity (identical planarity and flatness) of a plurality of linear circuit wires arranged with a high density on a substrate in various kinds of displays, such as a plasma display and EL, and a semiconductor wafer and the like.

2. Description of the Related Art

The increasing of the degree of integration, and an increase in the scale and area of display elements, such as a plasma display, and electronic parts and semiconductor elements and the like have been progressed, and the refining and lamination with the advance of the techniques needed for this progress of circuit wires are being forwarded. In a process for manufacturing such elements, the securing, etc. of a sectional area of wires, which are necessary for securing the insulation between wires, the preventing of the wires from being broken, the securing of the insulation between the laminated layers, and the operating of the elements properly are important problems.

The techniques for coating wires, which are formed on an element substrate by etching a metal film, with an insulating layer so as to secure the insulation between the wires, prevent the breaking of wires, secure the insulation between laminated layers of wires, and the like; flattening an upper surface of the insulating layer by polishing the same by a lapping machine and the like; and thereby solving the problems encountered in a lamination operation have been known well. In this method, it is necessary that the polishing operation be carried out as the thickness of an insulating layer on the wires is strictly controlled so as to secure the insulation between the wires and between the layers (refer to JP-A-8-240413).

However, in the method of forming wires by etching a metal film, an aspect ratio (ratio of the width of wires to the thickness of the metal film) becomes excessively large with the advancement of the refining of the wires. This makes it difficult to obtain a desired sectional shape of wires when the etching techniques are utilized. As a result, the securing of the sectional area of the wires needed to work the elements properly, and the occurrence of imperfect insulation and the like between the wires due to the remaining etched metal film become problems. In order to solve the problems, a process for making grooves for the wires in a film type insulator formed on the substrate in advance, forming a metal film on the insulator including the surface of the interior of the grooves, subjecting this metal film to a chemical and mechanical polishing process uniformly to the surface of the insulator, and thereby eliminating the metal on the insulator so as to leave only the metal in the grooves as wires has become to be employed. In this method, it is necessary that the depth of the grooves formed by the etching of the insulator be controlled with a high accuracy for the purpose of obtaining a sectional area required for the wiring operation (refer to JP-A-2002-048519).

Moreover, a means for forming a negative image of a wire pattern by photoresist members on a metal film formed on a semiconductor substrate, and forming wires by plating an upper surface of an exposed metal wire pattern with a metal, such as gold by a plating method is also known. In this method, plating current leakage occurs in a circumferential portion of the substrate to cause in some cases the thickness of a plated film in the central and circumferential portions to vary. Therefore, it is necessary that the height distribution of the upper surfaces of the metal wires with respect to that of the substrate or photoresist members be controlled (refer to JP-A-5-121403).

In order to carry out such a control operation, it is demanded that the coplanarity of a plurality of linear surfaces to be detected of not only the upper surfaces of the wires, bottom surfaces of the grooves or upper surfaces of plated metal wires but also an upper surface of an insulating layer, an upper surface of the substrate or the upper surfaces of photoresist members.

Methods of measuring the coplanarity of each linear surface to be detected and the flatness of the upper surface of a substrate by locally measuring the height of the upper surface of the substrate viewed from the linear surfaces to be detected and from a position between the linear surfaces to be detected, by using an interference spectroscopic film thickness gauge (JP-A-8-240413), a spot interference method (JP-A-2002-048519), an optical cutting method, a cofocal method, a shaded region measuring method using diagonal illumination (JP-A-2001-298036) and the like have heretofore been known.

However, such measuring methods need to set a plurality of measuring points, so that a lot of time is required to conduct measurement. Especially, these methods are not suited for the in-process measurement.

When the planarity of the substrate is excellent, the linear surfaces to be detected generally come to be flush with one another from a manufacturing stage therefor. Therefore, it is also conceivable that an interference fringe image corresponding to the shape of one flat surface constituting a plurality of linear surfaces to be detected be photographed by using an interferometer for measuring a surface shape, and that the coplanarity of each linear surface to be detected be determined by making an analysis of the same image. However, a virtual surface made of a plurality of linear surfaces to be detected is separated by insulators and the like existing between the linear surfaces to be detected, and does not form one continuous flat surface. The substrate surface or photoresist surface viewed from positions between the linear surfaces to be detected is also separated from each other by the linear surfaces to be detected, and does not form one continuous flat surface. Therefore, it is difficult to measure with a related art interferometer the general shape of the surface to be detected.

SUMMARY OF THE INVENTION

The present invention has been made in view of such circumstances, and aims at providing an interferometer for measuring a virtual contact surface, capable of measuring easily and with a high accuracy the coplanarity of each small surface to be detected, with respect to the direction of the height thereof in an object having a plurality of small surfaces to be detected formed so that the small surfaces to be detected are positioned on substantially mutually parallel different virtual surfaces like the linear surfaces to be detected formed highly densely on a substrate of a display element and on a semiconductor wafer and the like a substrate surface viewed from each linear surface to be detected.

The interferometer for measuring virtual contact surfaces according to the present invention comprises an interference optical system for obtaining interference light by irradiating an object and a reference surface of the interferometer with measuring light and synthesizing the reflected light from the object and that from the reference surface with each other, and a light detecting surface for detecting the optical intensity distribution of the interference light, wherein the following structure is provided for measuring the shape of a first virtual contact surface engaged with a first small surface to be detected formed so as to be positioned in a first arrangement pattern on a first reference virtual surface and that of a second virtual contact surface engaged with a second small surface to be detected formed so as to be positioned in a second arrangement pattern on the second reference virtual surface substantially parallel to the first reference virtual surface.

Namely, in the interferometer for measuring virtual contact surfaces according to the present invention, the measuring light is low coherent light having coherent distance shorter than an optical path length difference between the reflected light from the first small surface to be detected and that from the second small surface to be detected, the interferometer comprises:

an optical path length regulating section that regulates, during first measuring time in which the first small surface to be detected is an object of measurement, optical path length so that the reflected light from the first small surface to be detected and the reflected light from the second small surface to be detected interfere with each other, and regulates, during second measuring time in which the second small surface to be detected is an object of measurement, optical path length so that the reflected light from the second small surface to be detected and the reflected light from the reference surface interfere with each other;

an image forming regulating section that forms during the first measuring time at least a part of an image of the first small surface to be detected, and forms during the second measuring time at least a part of an image of the second small surface to be detected, in each of a plurality of detecting unit regions set in a divided manner on the light detecting surface; and an interference fringe obtaining section that acquires during the first measuring time first interference fringe information corresponding to a shape of a first virtual contact surface engaged with the first small surface to be detected, and acquires during the second measuring time second interference fringe information corresponding to a shape of a second virtual contact surface engaged with the second small surface to be detected, based on each optical intensity averaged and detected in each of the detection unit regions.

According to the present invention, the interference fringe obtaining section can be formed so as to determine each of phases of parts corresponding to the detecting unit regions of the first and second virtual contact surfaces, based on the each optical intensity, determine general phase distribution of the first and second virtual contact surfaces based on each of the phases, and obtain the first and second interference fringe information.

In the optical path of the interference optical system, it is preferable to provide an unnecessary light eliminating section that performs, in an optical path of the interference optical system, at least one of (i) allowing an arrival at the light detecting surface of the reflected light from such a small surface to be detected that constitutes an object for measurement out of the first and second small surfaces to be detected and inhibiting an arrival at the light detecting surface of the reflected light from other part and (ii) allowing an arrival at the light detecting surface of the reflected light from the reference surface which is synthesized with the reflected light from such a small surface to be detected that constitutes an object for measurement and inhibiting an arrival at the light detecting surface of the reflected light from the reference surface which is synthesized with the reflected light from such a small surface to be detected that does not constitute an object for measurement.

The unnecessary light eliminating section can be formed so that the unnecessary light eliminating section comprises, in a position corresponding to an arrangement pattern of such a small surface to be detected that constitutes an object for measurement, an opening allowing the arrival at the light detecting surface of at least one of: the reflected light from such a small surface to be detected that constitutes an object for measurement; and the reflected light from the reference surface which is synthesized with the reflected light from such a small surface to be detected that constitutes an object for measurement, the unnecessary light eliminating section being also able to be formed so that the unnecessary light eliminating section can be withdrawn from and inserted into the optical path of the interference optical system.

The present invention can be applied to even a case where first or second small surface to be detected is made of one small surface to be detected of a very small width and a large length with the small surface to be detected distributed so as to meander or whirl on a reference virtual surface, besides a case where first and second small surfaces to be detected are made of a plurality of separated small surfaces to be detected. The shape of the small surfaces to be detected is not limited to circular and square shapes. Small surfaces to be detected of various shapes, such as linear and curved shapes are included.

The virtual contact surface mentioned above is not limited to a flat surface. The case where the virtual contact surface is made of various spherical surfaces capable of measuring light interference, such as a spherical surface, a non-spherical surface and the like is included.

The "virtual contact surface is engaged with a small surface to be detected" means that, when the small surface to be detected is one surface of a very small width and a large length distributed in a meandering manner or in a whirling manner, the virtual contact surface is engaged continuously with each part of the small surface to be detected, and that, when there are a plurality of small surfaces to be detected, the virtual contact surface is engaged continuously with each small surface to be detected.

DETAILED DESCRIPTION OF THE INVENTION

A mode of embodiment of the present invention will now be described in detail with reference to the drawings.

<Construction of Apparatus>

Figure 1:
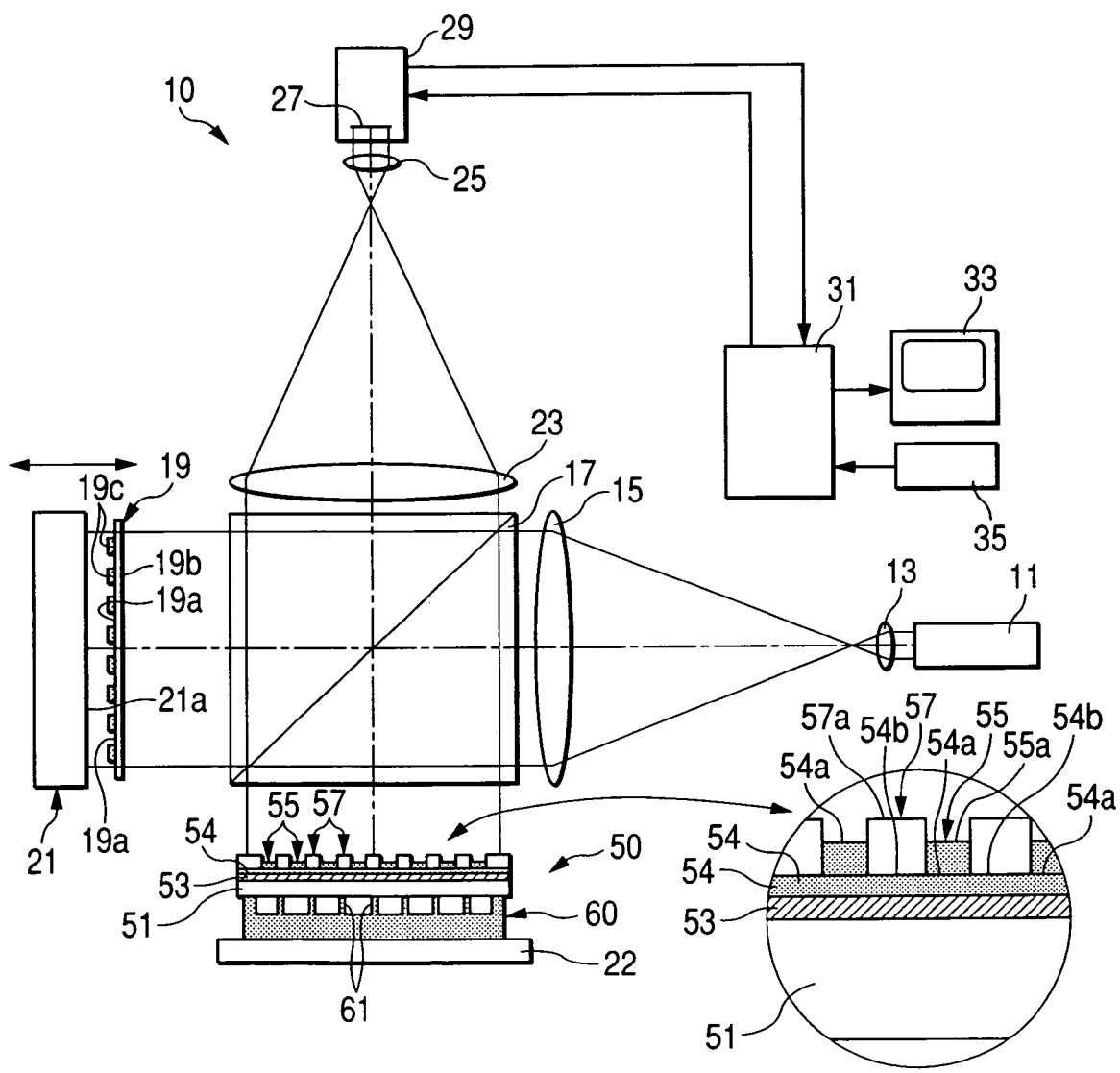
FIG. 1 is a rough construction diagram of the interferometer for measuring virtual contact surfaces in one mode of embodiment of the present invention.
Figure 2:
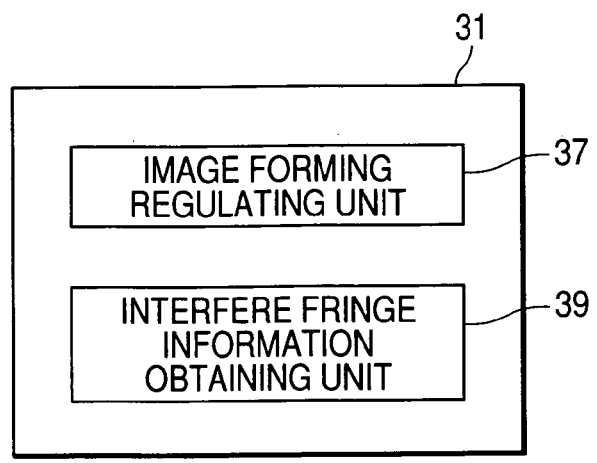
FIG. 2 is a rough construction diagram of the controller shown in FIG. 1.

First, the interferometer for measuring virtual contact surfaces in a mode of embodiment of the present invention will be roughly described on the basis of FIG. 1 and FIG. 2. FIG. 1 is a rough construction diagram of the interferometer for measuring virtual contact surfaces in a mode of embodiment of the present invention, and FIG. 2 a rough construction diagram of the controller shown in FIG. 1.

An interferometer 10 (which will hereinafter be referred to simply as "interferometer" in some cases) for measuring virtual contact surfaces shown in FIG. 1 is a Michelson type interferometer mounted with a light source 11 adapted to output the light of a short coherent distance as measuring light. The interferometer 10 is provided in the direction of advance of the light emitted from the light source 11 with a magnifying lens 13, a collimator lens 15, a beam splitter 17, a light shielding mask 19, a reference plate 21, an interference optical system provided above the beam splitter 15 and made of a condenser lens 23 and an imaging lens 25, and an image pickup section 29 having a light detecting surface 27 made of a solid image pickup elements, such as CCD and CMOS. The interferometer 10 is provided with a base 22 on which an object 50 to be detected is placed, a controller 31 including a computer adapted to make various kinds of computations, such as computations concerning the regulation of an imaging magnification and image processing in the image pickup section 29, a monitor 33 adapted to display an interference fringe image, and an input unit 35 adapted to put various kinds of information into the controller 31. The reference plate 21 is provided with a fringe scanning adapter (not shown) as an optical path length regulating section adapted to finely move the reference plate 21 in the direction of the optical axis (direction of a dual arrow in the drawing) when the fringe scanning measurement is conducted and when the optical path length is regulated.

As the light source 11, low coherence light sources, such as LED, SLD, a halogen lamp, etc., or a wavelength modulating light source regulated so that, when an image of the coherent fringe is taken in by an image pickup element of the image pickup section 29, a coherent distance thereof becomes equivalent to that which the low coherence light source possesses can be used. This kind of wavelength modulating light source is adapted obtain results equivalent to those of the case where a light source emitting the light of a large spectrum width and a short coherent distance is used, by modulating the wavelength of the light emitting from the light source (a semiconductor laser light source is generally used) within a period of time shorter than the response time (light accumulation time) of the image pickup element, and picking up a coherent fringe on an average with respect to the time during the response time of the image pickup element. For example, the Optical Wave Sensing Preparatory Manuscript Collection issued in May 1995, pages 75 to 82, discloses a method of synthesizing coherence functions. In addition, the techniques developed by the applicant of the present invention by improving this method are disclosed as well in (JP-A-2002-192619).

The object 50 to be detected shown in FIG. 1 is provided with an insulating layer 53 formed on the rectangular base plate 51, a conductive layer 54 formed on the insulating layer 53, a plurality of metal wires 55 provided highly densely on the surface of the conductive layer 54, and a plurality of photoresist members 57 formed among the metal wires 55. The metal wires 55 and photoresist members 57 are formed so that they extend linearly in the vertical direction of the surface of the drawing and alternately in the lateral direction of the drawing at predetermined intervals.

A concrete method of manufacturing the object 50 to be detected is as follows. The surface of the base plate 51 is formed so that the same surface has a highly accurate planarity when the base plate 51 is adsorbed to a pin chuck board 60. The insulating layer (for example, silicon oxide film) 53 is formed on the surface of the base plate 51 by CVD method and the like, and the conductive layer (for example, gold) 54 by a sputtering method and the like. The photoresist members 57 are then applied to the resultant conductive layer 54 by a method, such as a spin-coating method and the like. A desired circuit wire pattern is then printed on the photoresist members 57, and a developing process is carried out, the portion of the photoresist members 57 on which the circuit wires are formed being thereby removed to form a small regional surfaces 54a of the conductive layer 54 to be plated on which the conductive layer 54, from which the photoresist members 57 are removed, is exposed. The plating process is carried out with this conductive layer 54 used as a current supply passage while the film of plating grows. As a result, the plated metal wires 55 laminated to a predetermined thickness on the small regional surfaces 54a of the conductive layer with a surrounding portion of the photoresist members 57 used as masks as shown on an enlarged scale in a circle in a right lower portion of FIG. 1 constitutes the object 50 to be detected.

In a practical circuit substrate manufacturing process, the metal wire 55 is laminated to a predetermined thickness, and the surrounding photoresist member 57 functioned as a mask is removed. The small regional surface of the conductive layer 54 exposed after the photoresist member 57 is removed and the insulating layer 53 were removed by dry etching to obtain the circuit substrate on which the metal wire 55 is formed.

In the above-described circuit substrate manufacturing method, the insulating layer 53, conductive layer 54 and photoresist members 57 can be formed to a substantially uniform thickness owing to the characteristics of this method. However, the metal wires 55 laminated on the small regional surfaces 54a of the conductive layer to be plated have problems. Namely, setting constant on the whole region of the surface of the base plate 51 during the plating time the current density of the metal wires 55 laminated on the small regional surface 54a of the conductive layer to be plated is not easy, and the controlling of a plating liquid is difficult. Although an attempt to control the metal wires 55a is made so that the height thereof laminated, i.e. the upper surfaces 55a thereof are arranged orderly on a predetermined virtual flat surface (first reference virtual surface), the purpose is not served in some cases. In some cases, the upper surfaces 55a of the metal wires grow not lower than those 57a of the photoresist members 57, and unite with the upper surface 55a of the adjacent metal wire to cause even imperfect insulation to occur. Therefore, it is demanded that the coplanarity of the upper surfaces 55a of the metal wires 55 be measured.

The measurement mentioned above is conducted with the object 50 to be detected retained by, for example, the illustrated pin chuck 60 and the like. This pin chuck 60 is a correction chuck which is provided with a plurality of support pins 61 standing close together in a vacuum chamber opened to the support surface side of the base plate, and which is adapted to discharge the air from the vacuum chamber with the object 50 to be detected supported from the side of the lower surface thereof on the upper end surfaces of the support pins 61, the object to be detected being thereby adsorb-fixed on the support pins 61. In order to maintain the planarity of the base plate 51 (the upper surface of the conductive layer 54 and that 57*a* of the photoresist members 57) for the adsorb-retained object 50 to be detected, the support pins 61 are formed so that the height of the upper end surfaces thereof becomes accurately equal.

The controller 31 is provided as shown in FIG. 2 with an image forming regulating unit 37 made of an arithmetic circuit, a memory and a program and the like stored in this memory which are included in the computer mentioned above, and an interference fringe information obtaining unit 39. These constitute the image forming regulating section and interference fringe information obtaining section respectively in the present invention.

The interferometer 10 in this mode of embodiment is formed so that first measurement for determining the coplanarity of the upper surfaces 55*a* of the metal wires 55 and second measurement for determining the planarity of the surface of the conductive layer 54 are practiced in such a plating process as was described above. The upper surfaces 55*a* of the metal wires 55 correspond to the first small surfaces to be detected in the present invention, while the surface (which will hereinafter be referred to as "small regional surface 54*b* of the conductive layer") viewed from positions among the metal wires 55 corresponds to the second small surfaces to be detected in the present invention. These small regional surfaces 54*b* are set orderly on the virtual flat surface (second virtual surface) parallel to the first virtual flat surface when the planarity of the surface of the conductive layer 54 is maintained.

The procedure for measurement conducted by the interferometer 10 in this mode of embodiment will be described by dividing the procedure into a first procedure of measurement and a second procedure of measurement. The first and second procedures for measurement are conducted with the object 50 to be detected adsorption-retained by the pin chuck 60 so as to eliminate the warp of the object 50 to be detected.

<First Measurement>

In the first measurement, the uniformity of the height of the upper surfaces 55*a* of the linear wires 55 shown in Fig. is measured. First, the reference plate 21 is moved, and the optical path is thereby regulated so that the reflected light from the upper surfaces 55*a* of the linear wires 55 and that from the reference surface 21*a* of the reference plate 21 interfere with each other.

The light shielding mask 19 is then set in the portion (position near the reference surface 21*a* is preferable) of the optical path which is between the beam splitter 17 and reference surface 21*a*. This light shielding mask 19 constitutes in the optical path of the interference optical system an unnecessary light eliminating section formed so as to allow the arrival at the light detecting surface of the reflected light from the reference surface 21*a* which is synthesized with that from the upper surfaces 55*a* of the metal wires 55, and so as to inhibit the arrival at the light detecting surface of the reflected light from the reference surface 21*a* which is synthesized with that from the upper surfaces 57*a* of the photoresist members 57 and that from the small regional surfaces 54*b* of the conductive layer, i.e. ground surfaces coated with the photoresist members 57. This light shielding mask 19 is provided with a plurality of linear openings 19*a* which allow the light to pass therethrough. The light shielding mask 19 is provided in the regions of one surface of a transparent plate 19*b* which are other than the regions thereof corresponding to those of the openings 19*a* with absorption type ND coats 19*c* laminated thereon. The light-shielding mask is formed so as to allow the light entering the openings 19*a* to pass therethough, and inhibit the light entering the absorption type ND coats 19*c* from passing therethrough.

The light-shielding mask 19 is formed so that the mask can be withdrawn from and inserted into the optical path, and the plural openings 19*a* are provided so that they are aligned with the arrangement pattern of the upper surfaces 55*a* of the metal wires 55. Namely, the light-shielding mask 19 is set in the optical path during the first measurement time, during which time the position of the light-shielding mask is regulated so that the openings 19*a* are placed in the position in which the light synthesized with the reflected light from the upper surfaces 55*a* of the metal wires 55 passes.

Figure 3:
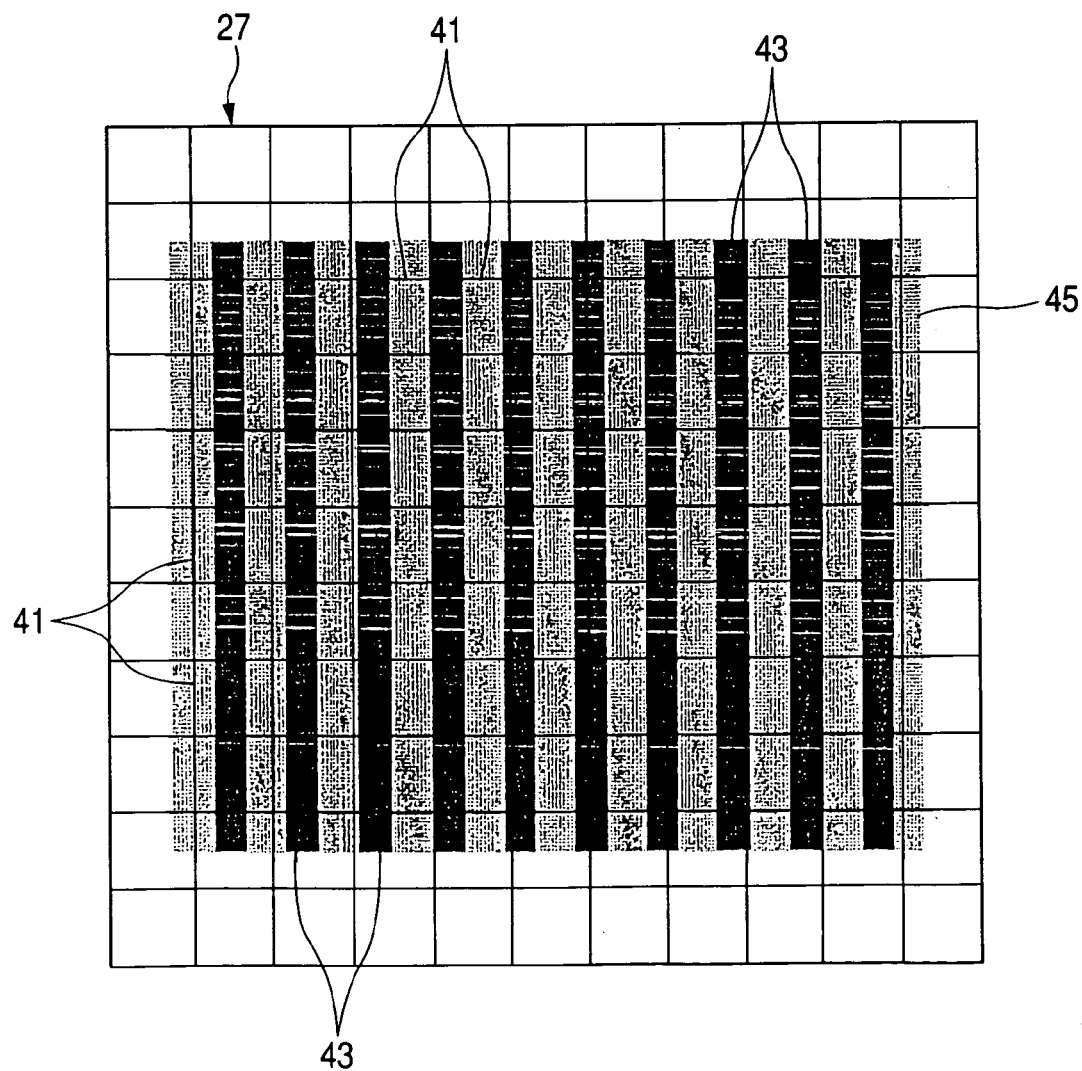
FIG. 3 is a drawing showing an example of the imaged condition on the light detecting surface shown in FIG. 1.

The imaging magnification of the image pickup section 29 is then regulated by the image forming regulating unit 37 so that at least a part of the images of the upper surfaces 55*a* of the metal wires 55 is formed on each of the plural detecting unit regions set in a divided manner on the light detecting surface 27 shown in FIG. 1. An example of such imaged condition on the light detecting surface 27 is shown in FIG. 3. FIG. 3 shows an example of the imaged condition of each metal wire on the light detecting surface 27.

What are shown by small rectangles in FIG. 3 are a plurality of detecting unit regions 41 (adding reference numerals to some of which is omitted) set in a divided manner on the light detecting surface 27, and what are shown by black elongated rectangles are images (upper surface images 43, adding reference numerals to some of which is omitted) of the upper surfaces 55*a* (refer to FIG. 1) of the metal wires 55. The part shown by a large rectangle is an image (base plate image 45) of the base plate 51 (refer to FIG. 1).

The image forming regulating unit 37 (refer to FIG. 2) is adapted to regulate the image magnification of the imaging section 29 (refer to FIG. 1) so that at least some of the upper surface images 43 are formed as shown in FIG. 3. Referring to FIG. 3, the region in which the upper surface image 43 is not formed at all out of the plural regions shown by small rectangles in FIG. 3 does not become a detecting unit region 41. The detecting unit regions 41 may be formed so that one picture element of the light detecting surface 27 corresponds to one detecting unit region 41 or so that one set of picture elements made of a plurality of adjacent picture elements (for example, 4, 9, 16 pieces of) image elements correspond to one detecting unit region 41.

The first interference fringe information corresponding to the shape of a virtual planar contact surface (first virtual contact surface) generally contacting the upper surfaces 55*a* of the metal wires 55 is then determined in the interference fringe information obtaining unit 39 (refer to FIG. 2) on the basis of each intensity of each light averaged in every detecting unit region 41 and detected. In this mode of embodiment, the interference fringe information obtaining unit 39 is formed so as to determine the phase of each part of the first virtual contact surface corresponding to each detecting unit region 41, and determine the general phase distribution of the virtual contact surface on the basis of each of these phases. The computation of the phase is made on the basis of the procedure for the fringe scanning measurement.

In the fringe scanning measurement, the phase corresponding to each small part of the interference fringe can be determined by varying in a stepped manner the phase difference between the reflected light from the reference surface of the interferometer and that from the surface to be detected, and subjecting the intensity distribution of the fringe obtained in each step to predetermined computation. In this mode of embodiment, the reference surface 21a of the reference plate 21 shown in FIG. 1 is moved in the direction of the optical axis. As a result, a phase difference between the reflected light from the reference surface 21a and that from the upper surfaces 55a of the metal wires 55 is finely regulated, and, in every regulating operation, the optical intensity is averaged and detected in every detecting unit region 41 on the light detecting surface 27 (when one picture element of the light detecting surface 27 corresponds to one detecting unit region 41, an averaging operation therefor is carried out in a regular detecting process but, when a plurality of adjacent picture elements correspond to one detecting unit region 41, the light intensity detected by each of the plural picture elements is averaged by using software.

The interference fringe information based on the interference light of the reflected light from the reference surface 21a and that from each of the upper surface 55a is superposed on each upper surface image 43 shown in FIG. 3. Therefore, the light intensity in the upper surface images 43 in each step of the fringe scanning process varies. On the other hand, the light intensity of the parts other than the upper surface images 43 does not vary in each step of the fringe scanning measurement. Accordingly, the averaged phase information on the upper surface images 43 included in each detecting unit regions 41 is necessarily superposed on the information on the light intensity averaged in each detecting unit region 41 in each step of the fringe scanning measurement. When the computation identical with the regular fringe scanning measurement is made, the phase of each part of the first virtual contact surface corresponding to each detecting unit region 41, the general phase distribution of the virtual contact surface being able to be determined on the basis of each phase.

Such computation of the phase distribution can be made on the premise that a scatter of the height of the upper surfaces 55a (refer to FIG. 1) corresponding to the upper surface images 43 included in the adjacent detecting unit regions 41 is smaller than ¼ of the wavelength of the measuring light. The upper surfaces of the conductive layer, photoresist members and metal wires formed on the base plate of the display element and the like generally satisfy such conditions in the stage in which the base plate is adsorbed to the pin chuck.

The interference fringe information obtaining unit 39 is formed so that interference fringe information corresponding to the shape of the first virtual contact surface is obtained on the basis of the general phase distribution thereof determined. The interference fringe information obtaining unit 39 is adapted to carry out an unlapping process on the assumption that the phase determined correspondingly to the adjacent detecting unit region 41 is substantially continuous, form an interference fringe image corresponding to the shape of the first virtual contact surface, make a shape analysis of the first virtual contact surface, and display the results on the monitor 33 (refer to FIG. 1). The general distribution of the height of the upper surface 55a of each metal wire 55 can be determined on the basis of the interference fringe information obtained.

<Second Measurement>

In the second measurement, the coplanarity of the upper positions of the surfaces of the small region of the conductive layer 54 viewed from positions among the metal wires 55 shown in FIG. 1 is measured via the photoresist members 57. First, the optical path length is regulated by moving the reference plate 21, so as to interfere with the reflected light from the small regional surfaces 54b of the conductive layers and that from the reference surface 21a of the reference plate 21 with each other. In this second measurement, reflected light from the upper surfaces 57a of the photoresist members 57 also occurs, and this reflected light is necessarily synthesized with that from the reference surface 21a. However, since the coherent distance of the measured light is shorter than the optical path difference between the reflected light from the small regional surfaces 54b of each conductive layer and that from the upper surface 57a of each photoresist member 57, the interference of the reflected light from the upper surface 57a of each photoresist member 57 and that from the reference surface 21a with each other does not occur.

The measurement conducted of the coplanarity of the small regional surfaces of the upper positions of the conductive layer 54b via the photoresist members 57 does not have a bad influence upon the measurement accuracy since a film of a substantially uniform thickness can be formed as mentioned above owing to the characteristics of the film forming method, and since the film thickness is as extremely small as several micron meters.

Instead of the light shielding mask 19, some other light shielding mask (not shown) is set in the portion of the optical path which is between the beam splitter 15 and reference surface 21. This light shielding mask has the same construction as the above-mentioned light shielding mask 19 except that the former allows in the optical path of the interference optical system the passage of the light synthesized with the reflected light from small regional surfaces 54b of the conductive layer and that from the upper surfaces 57a of the photoresist members 57, and inhibits the passage of the light synthesized with the reflected light from the upper surfaces 55a of the metal wires 55, and except that a plurality of linearly formed openings are provided so as to be aligned with the arrangement pattern of the small regional surfaces 54b of the conductive layer. When the width and arrangement intervals of the metal wires 55 and photoresist members 57 are equal, the light shielding mask 19 is laterally slid in the direction which is at right angles to that in which the openings 19a extends in a plane including the openings 19a. This enables the function of the changed light shielding mask to be performed.

The imaging magnification of the imaging section 29 is then regulated by the image forming regulating section 37 (refer to FIG. 2) so that at least a part of the image of each conductive layer small regional surface 54b is formed on each of the plural detecting unit regions 41 (refer to FIG. 3) set in a divided manner on the light detecting surface 27 shown in FIG. 1. Referring to FIG. 3, the portions positioned between the upper surface images 43 correspond to the positions in which the images of the small regional surfaces 54b of such a conductive layer are formed.

Next, in the interference fringe information obtaining unit 39, the general phase distribution on the virtual contact surface (second virtual contact surface), which generally contacts the small regional surfaces 54b of the conductive layer, is determined on the basis of the light intensity averaged and detected in each of the detecting unit regions 41, and the interference fringe information corresponding to the shape of the second virtual contact planar surfaces on the basis of the determined phase distribution. Since the procedure is the same as that described in the "First Measurement" above, a description of the procedure will be omitted.

When a regulation operation is carried out in the image forming and regulating unit 37 so that the detecting unit regions 41 include the same number and density of upper surface images 43 and images of the small regional surfaces 54b of the conductive surface, the interference fringe information corresponding to the shapes of the first and second virtual contact surfaces can be obtained on the basis of the light intensity averaged and detected with respect to each detecting unit 41 even in a case where the fringe scanning measurement operation is not carried out.

One mode of embodiment of the present invention has been described. The present invention is not limited to such a mode of embodiment. Various modes of embodiments can be taken.

In the above-described mode of embodiment, for example, the unnecessary light eliminating section is made of the light shielding mask capable of being withdrawn from and inserted into the optical path. The unnecessary light eliminating section can also be formed by the reference surface of the reference plate and the rear surface thereof (surface on the side of the collimator lens) subjected to a coating process. Forming an AR (anti-reflection) coat on such a region of the reference surface that is other than the region thereof which corresponds to the position of the openings 19a can also be employed as a mode of a coating process.

In the above mode of embodiment, the light shielding mask is provided in the portion of the optical path which is between the beam splitter and reference plate. It is also possible to provide such a light shielding mask in the portion of the optical path which is between the beam splitter and an object to be detected, and in both of these optical paths. In this case, the light shielding mask provided in the portion of the optical path which is between the splitter and object to be detected constitutes an unnecessary light eliminating section which allows the arrival at the light detecting surface of the reflected light from the small surface to be measured out of the first and second small surfaces to be measured, and inhibits the arrival at the light detecting surface of the reflected light from the small detecting surface not to be measured.

A micro-lens array for condensing measuring light on the first small surface to be detected or the second small surface to be detected may be provided in the portion of the optical path which is between the beam splitter and an object to be detected. When the micro-lens array has a structure in which circular lenses are arranged two-dimensionally in accordance with the arrangement pattern of the first or second small surfaces to be detected, or a structure in which the first and second small surfaces to be detected are arranged linearly and in parallel with each other as in the micro-lens array in the above-described mode of embodiment, a micro-lens array in which cylindrical lens are arranged in parallel with each other in accordance with the arrangement pattern of the first or second small surfaces to be detected can be employed. Such a micro-lens array can be used as a substitute section for the unnecessary light eliminating section in the present invention, or by being combined with the unnecessary light eliminating section.

The interferometer in the mode of the embodiment of the present invention is of a Michelson type. The present invention can also be applied to an equal optical path length type interferometer other than a Michelson type interferometer, for example, a known pass match path type interferometer (JP-A-9-21606), and the antiseismic type interferometer disclosed in Japanese Patent Application No. 292965/2003 suitable for in-process measurement.

When the optical distance twice as long as a difference in height between the first small surface to be detected and second small surface to be detected becomes shorter than the coherent distance of the measuring light outputted from a general low-coherence light source, the difference between the optical length of the reflected light from the first and second small surfaces to be detected can be set larger than the coherent distance of the measuring light by applying the present invention to an oblique incidence type interferometer. However, when the oblique incidence type interferometer is used, it is necessary to give consideration to the radiation direction of the measuring light in accordance with the arrangement pattern of the first and second small surfaces to be detected, which become objects for measurement when the measuring light is applied thereto, so as not to cause shades to occur on the small surfaces to be detected.

The interferometer for measuring virtual contact surfaces according to the present invention has the above-described construction. Therefore, it becomes possible to measure with a high accuracy the general position distribution (coplanarity) with respect to the direction of height of a plurality of kinds of small surfaces to be detected formed so that the small surfaces to be detected are positioned on mutually parallel, different virtual surfaces just as each linear surface to be detected formed highly densely on the substrate of a display element, a semiconductor wafer and the like and a substrate surface viewed from each linear surface to be detected, by obtaining an interference fringe corresponding to the shape of a virtual contact surface engaged with each small surface to be detected.

Since setting a plurality of measuring points as in a spot interference method is not necessary, the time required to conduct measurement can be reduced.

Since it is possible to use low coherence light as the measuring light, and regulate the optical path length concerned with the interference by using the optical path length regulating section, the measurement via the above-mentioned transparent insulating layer and photoresist members can be conducted.

The entire disclosure of each and every foreign patent application from which the benefit of foreign priority has been claimed in the present application is incorporated herein by reference, as if fully set forth.

What is claimed is:

1. An interferometer for measuring virtual contact surfaces, comprising:
    an interference optical system that irradiates an object and a reference surface of the interferometer with measuring light, wherein the object comprises: a first small surface to be detected formed so as to be positioned in a first arrangement pattern on a first reference virtual surface; and a second small surface to be detected formed so as to be positioned in a second arrangement pattern on a second reference virtual surface substantially parallel to the first reference virtual surface, so as to obtain interference light by synthesizing a reflected light from the first or second small surface to be detected and a reflected light from the reference surface with each other; and
    a light detecting surface on which an intensity distribution of the interference light is detected,
    wherein the measuring light is low coherent light having a coherent distance shorter than an optical path length difference between the reflected light from the first small surface to be detected and the reflected light from the second small surface to be detected, wherein the interferometer comprises:

an optical path length regulating section that regulates, during first measuring time in which the first small surface to be detected is an object of measurement, optical path length so that the reflected light from the first small surface to be detected and the reflected light from the second small surface to be detected interfere with each other, and regulates, during second measuring time in which the second small surface to be detected is an object of measurement, optical path length so that the reflected light from the second small surface to be detected and the reflected light from the reference surface interfere with each other;

an image forming regulating section that forms during the first measuring time at least a part of an image of the first small surface to be detected, and forms during the second measuring time at least a part of an image of the second small surface to be detected, in each of a plurality of detecting unit regions set in a divided manner on the light detecting surface; and an interference fringe obtaining section that acquires during the first measuring time first interference fringe information corresponding to a shape of a first virtual contact surface engaged with the first small surface to be detected, and acquires during the second measuring time second interference fringe information corresponding to a shape of a second virtual contact surface engaged with the second small surface to be detected, based on each optical intensity averaged and detected in each of the detection unit regions.

2. An interferometer for measuring virtual contact surfaces according to claim 1, wherein the interference fringe obtaining section is formed so as to determine each of phases of parts corresponding to the detecting unit regions of the first and second virtual contact surfaces, based on the each optical intensity, determine general phase distribution of the first and second virtual contact surfaces based on each of the phases, and obtain the first and second interference fringe information.

3. An interferometer for measuring virtual contact surfaces according to claim 1, further comprising:

an unnecessary light eliminating section that performs, in an optical path of the interference optical system, at least one of (i) allowing an arrival at the light detecting surface of the reflected light from such a small surface to be detected that constitutes an object for measurement out of the first and second small surfaces to be detected and inhibiting an arrival at the light detecting surface of the reflected light from other part and (ii) allowing an arrival at the light detecting surface of the reflected light from the reference surface which is synthesized with the reflected light from such a small surface to be detected that constitutes an object for measurement and inhibiting an arrival at the light detecting surface of the reflected light from the reference surface which is synthesized with the reflected light from such a small surface to be detected that does not constitute an object for measurement.

4. An interferometer for measuring virtual contact surfaces according to claim 3, wherein the unnecessary light eliminating section comprises, in a position corresponding to an arrangement pattern of such a small surface to be detected that constitutes an object for measurement, an opening allowing the arrival at the light detecting surface of at least one of: the reflected light from such a small surface to be detected that constitutes an object for measurement; and the reflected light from the reference surface which is synthesized with the reflected light from such a small surface to be detected that constitutes an object for measurement.

5. An interferometer for measuring virtual contact surfaces according to claim 3, wherein the unnecessary light eliminating section is formed so that the unnecessary light eliminating section can be withdrawn from and inserted into the optical path of the interference optical system.

* * * * *